United States Patent
Pribil et al.

(10) Patent No.: US 6,570,695 B1
(45) Date of Patent: *May 27, 2003

(54) METHOD AND DEVICE FOR GENERATING AN ERROR SIGNAL IN CONNECTION WITH COHERENT HETERODYNE RECEPTION OF LIGHTWAVES

(75) Inventors: Klaus Pribil, Glattbrugg (CH); Edgar Fischer, Müllheim Dorf (CH); Carsten Meier, Zurich (CH)

(73) Assignee: Contraves Space AG, Zurich (CH)

( * ) Notice: Subject to any disclaimer, the term of this patent is extended or adjusted under 35 U.S.C. 154(b) by 0 days.

This patent is subject to a terminal disclaimer.

(21) Appl. No.: 09/410,961

(22) Filed: Oct. 5, 1999

(30) Foreign Application Priority Data

Dec. 22, 1998 (CH) .............................................. 2532/98

(51) Int. Cl.⁷ .............................................. H04B 10/06
(52) U.S. Cl. ................. 359/191; 359/152; 359/153; 359/159; 359/172; 359/189; 359/193; 359/195; 359/154; 359/180
(58) Field of Search ................. 359/191, 154, 359/152, 172, 159, 153, 180, 189, 193, 195, 190

(56) References Cited

U.S. PATENT DOCUMENTS 5,062,150 A * 10/1991 Swanson et al. ............. 359/152
5,252,852 A * 10/1993 Makiuchi et al. ........... 257/458
5,978,121 A * 11/1999 Fischer et al. .............. 359/156
5,991,062 A * 11/1999 Fischer et al. .............. 359/191
6,259,558 B1 * 7/2001 Fischer et al. .............. 359/399

FOREIGN PATENT DOCUMENTS

| EP | 0 365 028 | 4/1990 |
| EP | 0 831 604 | 3/1998 |
| FR | 2 632 075 | 12/1989 |

OTHER PUBLICATIONS

Jackie S.C. Fung, *A novel angular discriminator for spatial tracking in free-space laser communications*, SPIE vol. 1417 pp. 224–232, Jan. 1991.

* cited by examiner

*Primary Examiner*—Leslie Pascal
*Assistant Examiner*—Hanh Phan
(74) *Attorney, Agent, or Firm*—Townsend and Townsend and Crew LLP

(57) ABSTRACT

A device is used for generating error signals for regulating the optical alignment of two lightwaves in connection with coherent heterodyne reception and comprises a receiver device (2, 3, 4) arranged focused opposite a front face at the end of a lightwave fiber (7) in order to make possible the transmission of the received information lightwave through the lightwave fiber (7) to an optical waveguide coupler (6), which is connected via a further lightwave fiber (13) with a local laser (12) and via two further lightwave fibers (8, 9) with respectively one detector (10, 11) for generating at least one error signal (Sr). A piezoelectric deflection unit (5) acts on this front face of the lightwave fiber (7) located in the focusing area of the receiving device.

17 Claims, 3 Drawing Sheets

METHOD AND DEVICE FOR GENERATING AN ERROR SIGNAL IN CONNECTION WITH COHERENT HETERODYNE RECEPTION OF LIGHTWAVES

TECHNICAL FIELD OF THE INVENTION

The invention relates to a method and device in for generating an error signal in connection with the coherent heterodyne reception of lightwaves.

BACKGROUND OF THE INVENTION

A device with a local laser and two detectors is known from. European Laid-Open Document EP-0 831 604 A1 for checking the optical alignment of two lightwaves in connection With coherent heterodyne reception, each of which includes two identical detector halves, which are respectively separated by a strip shaped interruption or by gaps in the surface of the photodiode electrode, wherein the gaps in the two detectors are arranged orthogonally in respect to each other. This device is employed as a direction-selective optical monomode receiver. In this case, blocking is provided in a receiving telescope of this device as well as in the beam path of the local laser. This permits the generation of an error signal for a spatial beam regulation of an optical heterodyne receiver with a good signal-to-noise ratio, while avoiding to the greatest degree possible systematic losses, and while at the same time interfering as little as possible with the data signal to be transmitted.

An optical bench is furthermore known from European Laid-Open Document EP-0 844 473 A1, whose bench structure is such that, in case of a heat distortion of arms provided for the connection of the support elements of various optical units, the support elements can be displaced without tilting transversely in respect to axes, which have defined angular positions in respect to each other and to the bench structure. Such an optical bench can be combined with the device mentioned at the outset.

Although such a "tracking sensor" method permits the simultaneous communication and determination of the spatial tracking error, the appropriate device has been shown to be disadvantageous on account of the relatively large adjustment outlay during its production.

SUMMARY OF THE INVENTION

It is therefore the object of the invention to create a method and a device for the generation of an error signal in connection with the coherent heterodyne reception of lightwaves, which results in a simpler adjustment of such a system.

A device is used for generating error signals for regulating the optical alignment of two lightwaves in connection with coherent heterodyne reception and comprises a receiver device arranged focused opposite a front face at the end of a lightwave fiber in order make possible the transmission of the received information lightwave through the lightwave fiber to an optical waveguide coupler, which is connected via a further lightwave fiber with a local laser and via two further lightwave fibers with respectively one detector for generating at least one error signal (Sr). A piezoelectric deflection unit acts on this front face of the lightwave fiber located in the focusing area of the receiving device.

The novel reception principle, in which the so-called free beam overlay is omitted, does not only result in a simplification of the method for the optimization of the adjustment, but also in a simplification of the optomechanical structure.

BRIEF DESCRIPTION OF THE DRAWINGS

The invention will be explained in greater detail in what follows by means of drawings.

DESCRIPTION OF THE SPECIFIC EMBODIMENTS

Figure 1:
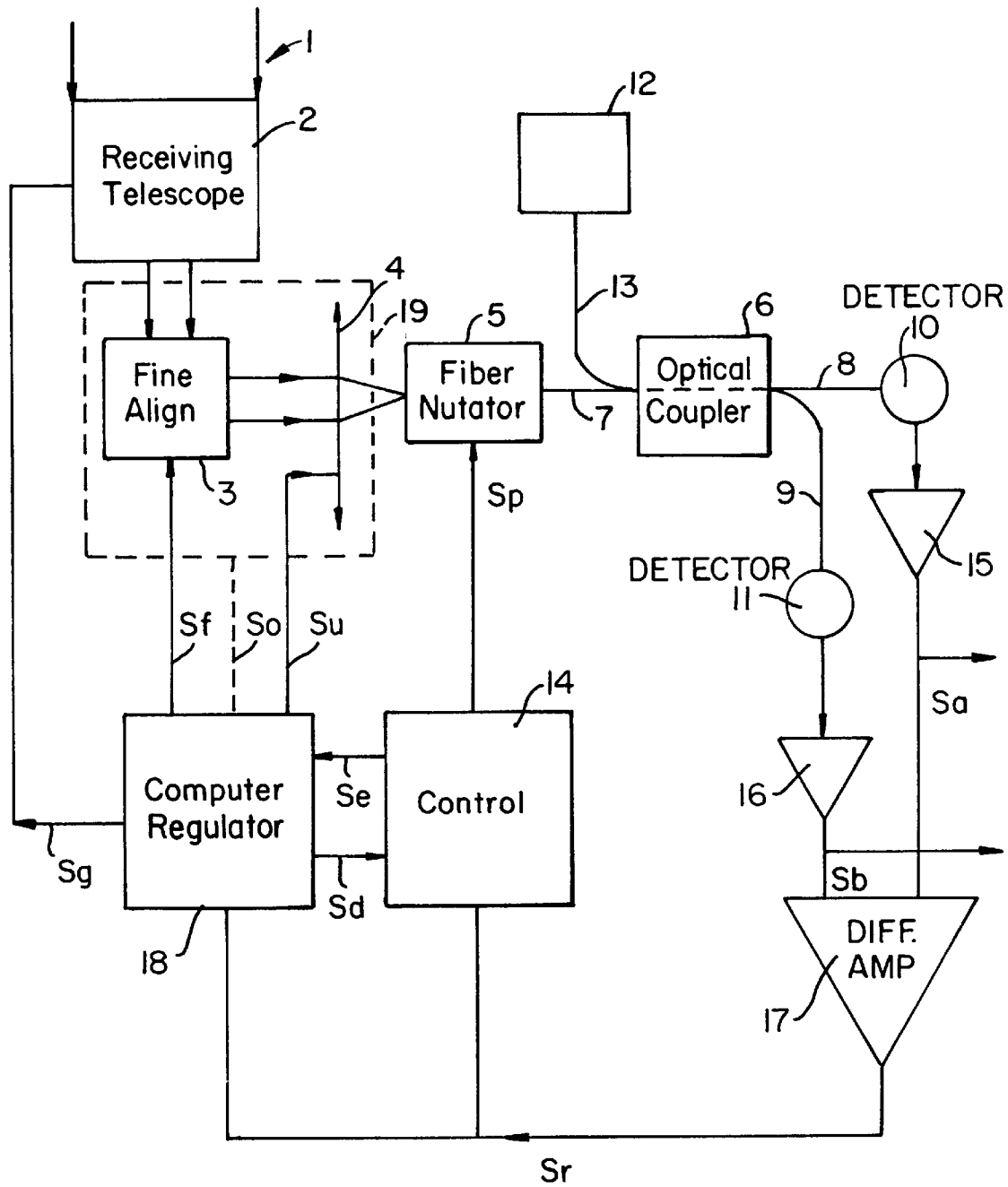
FIG. 1, a schematic representation of a device in accordance with the invention, FIG. 2, a schematic representation of the movement of a light spot on the front face of the lightwave fiber, FIG. 3, a schematic diagram of the chronologically asymmetric intensity signal on the detectors, if the fiber axis does not scan concentrically around the optical axis of the optomechanical system, and FIG. 4, a schematic representation of a so-called Kutter telescope without central blocking.

Similar to the device known from the mentioned EP 0-831 604 A1, in accordance with FIG. 1 an Rx wave carrying a data signal, or information lightwave 1 is received by means of a receiver unit, consisting of a receiving telescope 2, an fine alignment mechanism 3 and a lens 4, and is supplied to a beam splitter.

In contrast to the mentioned device, the beam splitter in accordance with the present invention has a fiber nutator 5 and an optical waveguide coupler 6. The end of a polarization- maintaining monomode fiber 7 is connected to the fiber nutator 5 for conducting the radiation received via the optical receiver unit to the optical waveguide coupler 6 and, via further monomode fibers 8 and 9 to a respective detector 10, or respectively 11. Such a fiber nutator is essentially a deflection unit with a fiber, which is caused to nutate by means of a piezo mechanism. A further, preferably polarization-maintaining monomode fiber 13 is connected to a local laser 12 in order to conduct the radiation generated by the local laser 12 to the optical waveguide coupler 6, and then via the monomode fibers 8 and 9 to the two detectors 10, or respectively 11. Unlike in connection with the known device, the detectors 10 and 11 are not split. The deflection unit 5 can receive control signals Sp from a control 14 via a bus or lines. The optical waveguide coupler 6 preferably is a 50%—50% coupler. By means of a polarization-maintaining fiber coupler it is possible to achieve a simple structure, which at the same time is inherently stable over a long time.

In place of the mechanical fiber nutator as the deflection unit, it is also possible to use an electrooptical deflector, wherein an electrical voltage generates a linear electrical field gradient over the aperture of an electrooptical crystal. An aperture of approximately 1 mm is also easily attainable with such a deflector.

The detectors 10 and 11 respectively provide signals Sa, or respectively Sb, via an amplifier 15, or respectively 16, which are employed as useful signals. But these signals Sa and Sb are also provided to the differential inputs of a differential amplifier 17. The device also comprises a regulator or computer/regulator 18, whose input is connected with the output of the differential amplifier 17, and which provides on the output side at least one regulating signal Sd for the control unit 14, which is also called a deflector control, and/or further regulating signals Sf and/or So for the fine adjustment of the fine alignment mechanism 3, or respectively for the movement of the lens 4. The regulator 18 can additionally emit regulating signals Sg for a coarse regulation of the receiving telescope 2 and can possibly also receive acknowledgement signals Se from the control unit 14.

Figure 2:
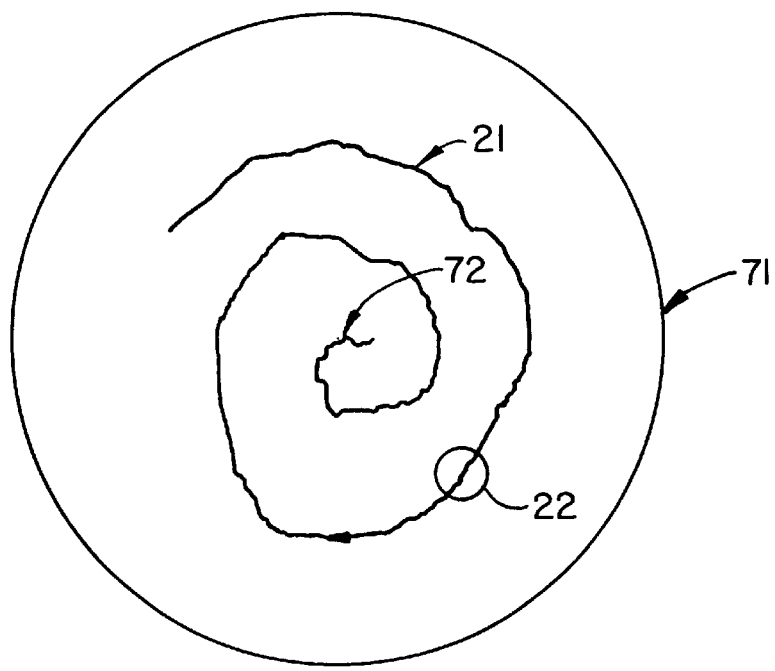

FIG. 2 shows how a light spot 22, which is guided by this regulated movement 21, is projected on a diametrical face on the end of the lightwave fiber of the deflection unit 5. The light spot 22 is brought at least approximately as far as the center of the lightwave fiber by means of the regulation.

Figure 3:
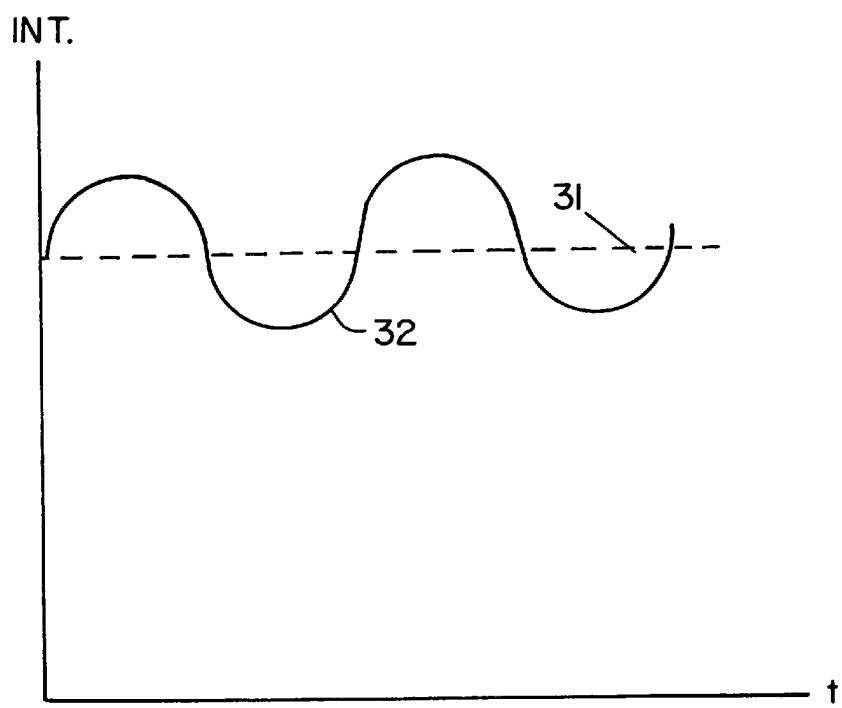

FIG. 3 shows how the average intensity signal 31 has an overlaid modulation signal 32 on the detectors 10 and 11, if the fiber axis does not concentrically scan around the optical axis of the optomechanical system. It is the purpose of the regulator 18 to move the fine alignment mechanism 3, the end of the fiber 7 and/or the lens 4 in such a way that this modulation signal 32 achieves a minimum value or a zero value.

Figure 4:
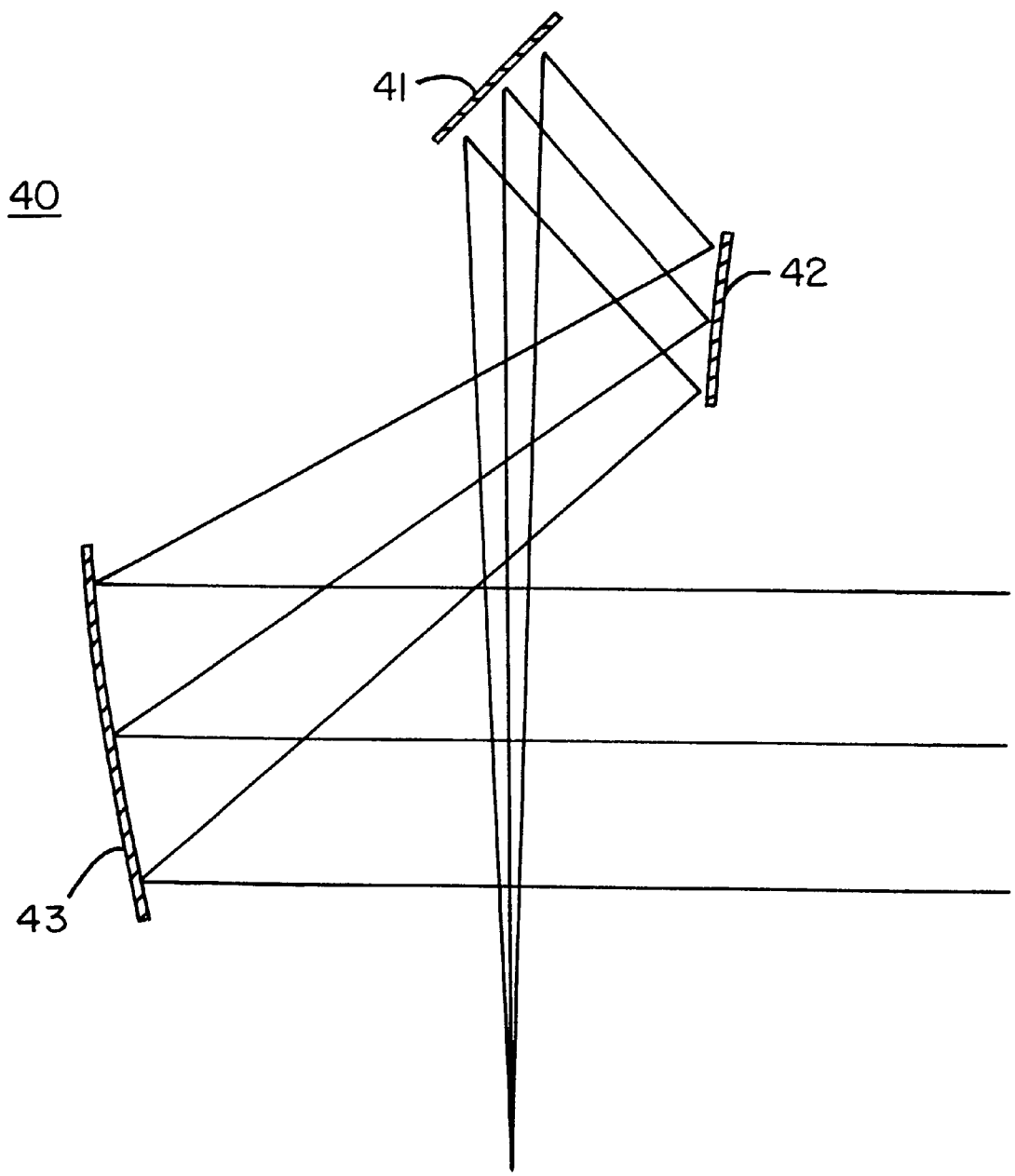

The Kutter telescope 40 represented in FIG. 4 has three mirrors 41, 42, 43, which are arranged in such a way that, in contrast to the Cassegrain system, it does not cause a central blockage, which is also of importance in connection with the present invention for fully utilizing the energy of the absolute central maximum of a diffraction image, which is similar to a band-limited pulse with a $\cos^2$ spectrum and zero crossings at $t=iT$ ($i=1, 2, 3, \ldots$ ), in order to achieve greater efficiency by this.

The device of the invention functions as follows:

The lightwave received by the optical receiver unit 2 is focused by means of the fine alignment unit 3 and with the aid of the lens 4 approximately on the center of the monomode fiber 7 in the fiber nutator 5, if the control unit is idle. When the control unit 14 becomes active, a movement (FIG. 2) of the light spot 22 around the center of the monomode fiber 7 is caused by the fiber nutator 5. The light spot 22 preferably describes a high-frequency circular movement around the optical axis of the optical receiver device. Although the end of the fiber 7 is moved by the nutator, there is no longer a spatial movement of the exiting light at the end of the fiber, at the detectors 10 and 11. Instead, the rotary movement by means of the nutator 5 causes an intensity modulation (FIG. 3), if the scanning movement does not take place exactly concentrically around the light spot.

The high-frequency mechanical scanning movement of the fiber end caused by the fiber nutator deflection unit 5 can be controlled, for example, by means of a lateral displacement mechanism or by a bending element. Rapid lateral displacement mechanisms with small movements are known from optoelectronic reading device, such as CD players, for example. But bending elements can be easily produced from piezoelectric tubelets with segmented electrodes. These tubelets are only fixed in place in one area, so that they can bend in the longitudinal direction because of the piezo effect. It is common to all mechanisms that they are controlled by so-called I-Q signals. Following I-Q demodulation of the intensity signal, the spatial error between the light spot 22 and the fiber axis is obtained in the end. Via the regulator 18, the error signal Sr causes the deviation error to be minimized.

The relative offset between the intensity distribution of the Rx light in the focal plane of the lens 4 and the end of the fiber 7 generated by the rotating movement therefore causes a chronologically asymmetric intensity signal on the detectors 10 and 11, if the fiber axis does not scan concentrically around the optical axis of the optomechanical system. Thus the scanning point detector is replaced by the mode field of a monomode fiber, and this with a very good approximation. In order to prevent too great a signal drop of the light coupled into the fiber, the scan radius of the mode field should not exceed 1/10 of the mode field radius.

The lightwave is split into two almost identical partial beams by the beam splitter, which are respectively supplied to each one of the two detectors 10 and 11 after the light of the local laser 12 has been coupled into the light current via the optical waveguide coupler 6. Respectively two error portion signals are generated by the two detectors 10, 11, which are each converted by means of an appropriate front end transimpedance amplifier 15, or respectively 16, into voltages Sa, or respectively Sb. The spatial error signal Sr is obtained from the signals Sa and Sb by forming the difference, and an output signal, which corresponds to the original data signals, results from the addition with the correct sign of the error portion signals Sa and Sb.

The overlay of the local laser wave with the Rx wave takes place only in the optical fiber, so that the degree of spatial correlation between the local laser field and the Rx field will equal 1, i.e. an overlay assuredly free of lines takes place. It is then possible in the course of the optimization during adjustment, or respectively for a later optimization during the operation, to assume an assuredly line-free overlay and to make the adjustment to the absolute amplitude maximum. This has proven to be very advantageous in contrast to the free beam overlay wherein, in contrast to the method of the invention, it can occur that interference lines because of a tilt angle still appear when overlaying the two waves. The optimal, i.e. line-free, adjustment state then can no longer be found by means of the intensity maximum alone. Moreover, in this case the distance between the levels of the main maximum and one of the side maxima is relatively small.

There still is the latent danger that the tracking regulator gets out of step and regulates in accordance with a side maximum of the intensity distribution, which then considerably restricts the linear regulating range.

By employing the receiving fiber 7, which can be relatively long, it is possible to house the receiver front end (RFE), i.e. the detectors 10, 11 and the amplifiers 15, 16, at a relatively great distance from the optical device. For this purpose the lightwave fibers can be placed into a flexible protective cable, or have a flexible sheathing. The heat being generated in the RFE is therefore optimally decoupled from the optical device and it is no longer necessary to account for RFE-induced thermal maladjustments in the optical subsystem. Thus, the optical elements 2, 3, 4 and 5 can be arranged at a relatively large distance from the electronic data devices and the RFE, which are located in the offset electronic unit. It is therefore possible by means of the movability of portions of the fiber to remove all problems (damping, EMC (electromagnetic compatibility)) resulting in the course of using long microwave conductors, even if it is then necessary to string a coaxial line from the electronic unit to the optical head in order to return the low-frequency tracking error signals (BW 10 kHz) to the front on this line.

Moreover, the device in accordance with the invention has been shown to be particularly advantageous in view of the fact that it has a great stability over a long time, that it can be optimized by means of a relatively simple algorithm in the course of beam overlaying, that with high-frequency data flows (clock rate=1000 mbps) there is no particularly significant damping in the connection line between the fiber nutator and the offset receiver front end (RFE)(cable lengths>3 m), that it does not require an additional electronic line driver device, that the cables need not be laid in fixed positions, so that movable partial areas are also possible, that it is problem-free regarding EMC interferences, that in connection with broadband systems RFEs with bandwidths>>1 GHz can be used, and that large heat generation because of the electronic HF devices is avoided in the direct vicinity of the optical devices. In this sense the device in accordance with the invention can replace the elements 16 and 26 of the optical bench of the mentioned Laid-Open Publication EP-0 844 473 A1 in an advantageous manner.

With one embodiment of the invention, the regulator or computer/regulator 18 can be embodied in such a way, that a movement of the movable end of the lightwave fiber 7 around the center of the focusing spot 22 of the information wave 1 is caused while the lens 4 is at rest.

With another embodiment of the invention, the regulator 18 can cause a movement of the lens 4 in order to move the focusing light spot 22 of the information wave 1 around the center of the lightwave fiber 7 while the lightwave fiber is at rest.

With a still further embodiment of the invention a combination of both movements can be caused.

The device in accordance with the invention can be employed for the same or similar purposes as that in the mentioned patent application EP 0 831 604 A1.

The above mentioned exemplary embodiments are merely understood to be a representation of the employment of such a device. Other embodiments resulting therefrom for one skilled in the art, however, also contain the basic concept of the invention.

What is claimed is:

1. In a method for generating an error signal in connection with the coherent heterodyne reception of lightwaves wherein:

an information lightwave (1) is relayed via a receiving telescope (2) and an optomechanical receiver means (19) to a deflection means (5) including a first lightwave fiber (7) having a front face (71) with a center (72), light of a local laser (12) is fed via a second lightwave fiber (13) to the information ligthwave (1) to be overlayed on the information lightwave, the information lightwave is split into two beam portions by a beam splitter (6) after having been overlayed with the light of the local laser (12), these beam portions are respectively relayed via a further respective lightwave fiber (8, 9) to a detectors (10, 11) for the generation of at least one error signal Sr, the deflection means (5) and the optomechanical receiver means (19) become active in a focusing area of the front face (71) of the first lightwave fiber (7), an improved method of focusing information lightwave (1) to the front face (71) of the first lightwave fiber (7) comprising the steps of:

providing optomechanical receiver means (19) including a fine alignment mechanism (3) and a lens (4);

focusing the information lightwave (1) at the front face (71) by means of the optomechanical receiver means (19) which includes the fine alignment mechanism (3) and the lens (4);

providing a computer regulator (8) for movement of at least the lens (4) of the optomechanical receiver means (19); and, moving the computer regulator (18) responsive to at least one error signal Sr to cause a focusing spot (22) of the information lightwave (1) to be focused on the center (72) of the front face (71) of first lightwave fiber (7).

2. The improved method of focusing information lightwave (1) to the front face (71) of the first lightwave fiber (7), in accordance with claim 1 comprising the further steps of:

providing a computer/regulator (18) for receiving the error signal Sr and generating regulating signals Sf, So for the fine alignment mechanism (3) and the optomechanical receiver means (19) including the lens (4) respectively;

inputing the error signal Sr to the input of the computer/regulator (18); and, generating the regulating signals Sf, So for the fine adjustment of the fine alignment mechanism (3) and for the optomechanical receiver means (19) including the lens (4), respectively.

3. The improved method of focusing information lightwave (1) to the front face (71) of the first lightwave fiber (7) in accordance with claim 1 comprising the further steps of:

providing a computer/regulator (18) for receiving the error signal Sr and generating regulating signals Su, Sf, So for the lens (4), for the fine adjustment of the fine alignment mechanism (3) and for the optomechanical receiver means (19) including the lens (4), respectively;

inputing the error signal Sr to the input of the computer/regulator (18); and, generating the regulating signals Su, Sf, So for the lens (4), for the fine adjustment of the fine alignment mechanism (3) and for the optomechanical receiver means (19) including the lens (4), respectively.

4. The improved method of focusing information lightwave (1) to the front face (71) of the first lightwave fiber (7) in accordance with claim 1 comprising the further steps of:

providing a control unit (14) for generating a regulating signal Sp for the fiber deflection means (5) from the error signal Sr;

focusing the lightwave (7) as a light spot (22) by means of the optomechanical receiver means (19) and with the aid of the lens (4) approximately on the center (72) of the first lightwave fiber (7) in the fiber deflection means (5), if the control unit (14) is idle responsive to the error signal Sr; and, generating a movement of the light spot (22) around, the center (72) of the first lightwave fiber (7) when the control unit (14) becomes active through the fiber deflection means (5) responsive to the error signal Sr.

5. The improved method of focusing information lightwave (1) to the front face (71) of the first lightwave fiber (7) in accordance with claim 4 comprising the further steps of:

generating a movement of the light spot (22) around the center (72) of the first lightwave fiber (7) when the control unit (14) becomes active through the fiber deflection means (5) to describes a high-frequency approximately circular movement around the center (72) of the first lightwave fiber (7) by means of the deflection means (5) to cause an intensity modulation, if the circular movement does not take place exactly concentrically around the center (72); and, inputting intensity modulation to the computer regulator (18) with the error signal Sr to cause any resulting deviation error between the light spot (22) and the center (72) of the first lightwave fiber (7) to be minimized.

6. The improved method of focusing information lightwave (1) to the front face (71) of the first lightwave fiber (7), in accordance with claim 4 comprising the further step of:

providing a nutator for the deflection means (5).

7. The improved method of focusing information lightwave (1) to the front face (71) of the first lightwave fiber (7) in accordance with claim 4 comprising the further steps of:

generating the error signal Sr from detectors (10, 11) outputting respective signals Sa, Sb via a respective amplifier (15, 16); and, inputting the respective signals Sa, Sb via the respective amplifiers (15, 16) to a differential amplifier (17) to generate the signal Sr.

8. An apparatus for generating an error signal in connection with the coherent heterodyne e reception of lightwaves having, an information lightwave (1) relayed via a receiving telescope (2) and an optomechanical receiver means (19) to a deflection means (5) including a first lightwave fiber (7) having a front face (71) with a center (72), light of a local laser (12) fed via a second lightwave fiber (13) to the information lightwave (1) to be overlaid on the information lightwave (1), the information lightwave is split into two beam portions by a beam splitter (6) after having been overlayed with the light of the local laser (12), these beam portions are respectively relayed via a further respective lightwave fiber (8, 9) to a detector (10, 11) for the generation of at least one error signal Sr, and the deflection means (5) and the optomechanical receiver means (19 become active in a focusing area of the front face (71) of the first lightwave fiber (7), an improvement of focusing information lightwave (1) to the front face (71) of the first lightwave idler (7) comprising:

optomechanical receiver means (19) for receiving the information signal (1) including a fine alignment mechanism and a lens (4) for focusing the information lightwave (1) at the front face (71) of the first lightwave fiber (7); and, a regulator (18) for movement of the lens (4) or a movement of the optomechanical receiver means (19) including the lens (4) responsive to at least one error signal Sr to cause a focusing spot (22) of the information lightwave (1) to be focused on the center (72) of the front face (71) of first lightwave fiber (7).

9. The apparatus for generating an error signal in connection with the coherent heterodyne reception of light waves according to claim 8 and further including:

first and second fibers are two monomode fibers (7, 13) to relay light to the detectors (10, 11);

detectors (10, 11) generate signals Sa, Sb via respective amplifiers (15, 16); and, a differential amplifier (17) generates the error signal Sr.

10. The apparatus for generating an error signal in connection with the coherent heterodyne reception of light waves according to claim 8 and wherein:

regulator (18) laterally moves lens (4).

11. The apparatus for generating an error signal in connection with the coherent heterodyne reception of light waves according to claim 8 and wherein:

at least one of the two monomode fibers (7, 13) is a polarization-maintaining the monomode fiber.

12. The apparatus for generating an error signal in connection with the coherent heterodyne reception of light waves according to claim 8 and wherein:

the receiving telescope (2) is without central blocking.

13. The apparatus for generating an error signal in connection with the coherent heterodyne reception of light waves according to claim 8 and wherein:

first and second fibers are without microwave conductors.

14. The apparatus for generating an error signal in connection with the coherent heterodyne reception of light waves according to claim 8 and further including:

a focusing spot (22) of the information lightwave (1) is focused on the center (72) of a front face (71) of a monomode fiber located in the fiber deflection means (5);

a control unit (14) for receiving the error signal Sr and generating regulating signals Sf, So for the control of the fine alignment mechanism (3) and optomechanical receiver means (19), respectively, to cause movement of the focusing light spot (22) around the center (72) of the monomode fiber through the fiber deflection means (5) whereby light spot (22) describes a high-frequency circular movement around the the center (72);

means interconnected to the regulator (18) for detecting intensity modulation when the light spot (22) does not described a concentric movement around the center (72); and, means in the regulator (18) for causing deviation error between the light spot (22) and the center (72) of the first lightwave fiber (7) to be minimized through adjustment of the error signal Sr.

15. The apparatus for generating an error signal in connection with the coherent heterodyne reception of light waves according to claim 14 and wherein:

the regulator (18) is connected to the control unit (14) for receiving acknowledgment signals Se.

16. The apparatus for generating an error signal in connection with the coherent heterodyne reception of light waves according to claim 8 and wherein:

deflection means (5) is a nutator.

17. The apparatus for generating an error signal in connection with the coherent heterodyne reception of light waves according to claim 8 and wherein:

the regulator (18) generates a regulating signal Sg for the course regulation of the receiving telescope (2).

* * * * *